United States Patent
Ha

(10) Patent No.: US 7,188,402 B2
(45) Date of Patent: Mar. 13, 2007

(54) DISC CENTERING DEVICE

(75) Inventor: Tae-hoe Ha, Jinju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 324 days.

(21) Appl. No.: 10/676,145

(22) Filed: Oct. 2, 2003

(65) Prior Publication Data

US 2004/0117980 A1 Jun. 24, 2004

(30) Foreign Application Priority Data

Dec. 24, 2002 (KR) .................. 10-2002-0083345

(51) Int. Cl.
*G11B 5/127* (2006.01)
*H04R 31/00* (2006.01)

(52) U.S. Cl. ............... 29/603.03; 29/729; 29/757; 29/759; 29/760; 360/98.07; 360/98.08; 360/99.08; 360/99.12

(58) Field of Classification Search ............ 29/603.03, 29/729, 737, 757, 759, 760; 360/98.07, 98.08, 360/99.08, 99.12
See application file for complete search history.

(56) References Cited

U.S. PATENT DOCUMENTS

| | | | | |
|---|---|---|---|---|
| 4,933,927 A | * | 6/1990 | Ross ..................... | 720/704 |
| 5,537,272 A | | 7/1996 | Kazmierczak et al. ... | 360/38.07 |
| 5,610,900 A | * | 3/1997 | Yamashita et al. ....... | 720/705 |
| 5,828,518 A | * | 10/1998 | Moir et al. .............. | 360/99.12 |
| 6,158,112 A | | 12/2000 | Kim et al. .............. | 29/759 |
| 6,356,409 B1 | | 3/2002 | Price et al. ............. | 360/99.08 |
| 6,453,541 B1 | | 9/2002 | Guthrie et al. ......... | 29/603.03 |

(Continued)

FOREIGN PATENT DOCUMENTS

CN 401562 8/1989

(Continued)

OTHER PUBLICATIONS

Responding to the challenge of producing and distributing MODIS data at the NASA/GES DISC via the Remote Sensing Information Partners (RSIP) program Qu, J.J.; Serafino, G.; Teng, B.; Ouzounov, D.; Pollack, N.; Chiu, L.; Geoscience and Remote Sensing Symposium, 2002. IGARSS '02. 2002 IEEE International □ □vol. 6, Jun. 24-28, 2002 pp. 3208-3210; vol. 6, Digital Object Indentifier 10.1109/IGARSS.2002.1027132.*

(Continued)

*Primary Examiner*—Paul D. Kim
(74) *Attorney, Agent, or Firm*—Staas & Halsey LLP

(57) ABSTRACT

A disc centering device includes a base plate, a chuck which is installed on the base plate, a hub unit which is detachably engaged to the chuck and in which a plurality of discs are stacked, disc pushers which are slidably provided outside the hub unit, and include corresponding plate springs which center the discs by pushing circumferences of the discs, supporting units which support the corresponding plate springs with respect to the disc pushers so as to reinforce a restoring force of the plate springs after a disc centering of the discs, and a driving unit which slides the disc pushers simultaneously. Accordingly, even though the disc centering is continuously performed, a centering value can be maintained within a desired range (deviation), and deformation of discs can be prevented.

30 Claims, 6 Drawing Sheets

U.S. PATENT DOCUMENTS

| | | | |
|---|---|---|---|
| 6,771,451 B2 * | 8/2004 | Morris et al. | 360/75 |
| 2001/0040751 A1 | 11/2001 | Hayakawa et al. | 360/75 |

FOREIGN PATENT DOCUMENTS

| | | |
|---|---|---|
| CN | 480443 | 3/1991 |
| CN | 1016019 B | 3/1992 |
| JP | 6-96557 | 4/1994 |
| JP | 9-120669 | 5/1997 |
| JP | 11-66766 | 3/1999 |
| JP | 2001-6265 | 1/2001 |
| JP | 2001-101781 | 4/2001 |
| JP | 2002-117646 | 4/2002 |
| KR | 97-55893 | 10/1997 |
| KR | 1998-058446 | 10/1998 |
| KR | 20-147518 | 3/1999 |
| KR | 10-223210 | 7/1999 |
| KR | 10-328502 | 2/2000 |
| KR | 2000-20562 | 4/2000 |
| KR | 2000-0026236 | 5/2000 |
| KR | 20-200895 | 11/2000 |
| KR | 2002-35456 | 5/2002 |

OTHER PUBLICATIONS

U.S. Appl. No. 10/676,025, filed Oct. 2, 2003, Yeom et al., Samsung Electronics Co., Ltd.

U.S. Appl. No. 10/676,144, filed Oct. 2, 2003, Yeom et al., Samsung Electronics Co., Ltd.

Office action issued by the KIPO on Jan. 19, 2005.

Office action issued by the SIPO on Feb. 18, 2005.

* cited by examiner

FIG. 6

|  | 1 TIME | 10 TIMES | 20 TIMES | 30 TIMES | 40 TIMES | 50 TIMES | DEVIATION |
|---|---|---|---|---|---|---|---|
| Disk1 | 7 μm | 13 μm | 7 μm | 15 μm | 11 μm | 11 μm | ±2 μm |
| Disk2 | 9 μm | 8 μm | 5 μm | 9 μm | 10 μm | 8 μm | ±1 μm |
| Disk3 | 11 μm | 5 μm | 7 μm | 6 μm | 6 μm | 8 μm | ±2 μm |
| Disk4 | 13 μm | 7 μm | 10 μm | 8 μm | 10 μm | 12 μm | ±2 μm |
| Disk5 | 10 μm | 3 μm | 10 μm | 5 μm | 8 μm | 13 μm | ±3 μm |
| Disk6 | 9 μm | 3 μm | 13 μm | 4 μm | 9 μm | 12 μm | ±3 μm |
| Disk7 | 5 μm | 2 μm | 15 μm | 2 μm | 7 μm | 9 μm | ±4 μm |
| Disk8 | 2 μm | 1 μm | 11 μm | 0 μm | 6 μm | 8 μm | ±4 μm |
| Disk9 | 2 μm | 6 μm | 17 μm | 1 μm | 8 μm | 12 μm | ±5 μm |
| Disk10 | 1 μm | 5 μm | 13 μm | 1 μm | 7 μm | 7 μm | ±3 μm |
| Disk11 | 2 μm | 11 μm | 11 μm | 15 μm | 3 μm | 7 μm | ±4 μm |
| Disk12 | 1 μm | 11 μm | 5 μm | 12 μm | 1 μm | 3 μm | ±4 μm |

DISC CENTERING DEVICE

CROSS-REFERENCE TO RELATED APPLICATIONS

This application claims the benefit of Korean Patent Application No. 2002-83345, filed Dec. 24, 2002, in the Korean Intellectual Property Office, the disclosure of which is incorporated herein by reference.

BACKGROUND OF THE INVENTION

1. Field of the Invention

The present invention relates to a disc centering device which centers a stack of discs.

2. Description of the Related Art

Generally, an HDD (Hard Disc Drive) is an auxiliary memory unit which records and retrieves data using its magnetized aluminum disc. Recording data after assembling 1 or 2 HDDs is difficult where one or more high density and high capacity HDDs are used. To solve this, a method of assembling HDDs after mounting a plurality of HDDs on a chuck and recording data thereon, has been introduced.

In this method, to prevent vibration generated by a rotation due to a recording of data, a centering process that enables a plurality of discs to have the same disc center is performed using a centering device.

According to a conventional disc centering device, a plurality of discs are centered by pushing circumferences of the discs using a pushing unit. This disc centering device is disclosed in Korean Patent Application No. 1996-53058, filed by the present applicant.

The above disc centering device is suitable for centering a relatively small number of discs, for example, 2 or 3 discs, but may not be suitable for centering 10 or more discs due to a configurational limit of respective parts of the disc centering device, including the pushing unit, and difficulty in securing accurate locations of the discs. Also, to fix a plurality of discs with the conventional centering device, a user has to manually manipulate the plurality of discs by his/her own hands. Accordingly, the efficiency and reliability of centering the discs are lowered.

To solve some of the problems described above, a disc chuck can be used to chuck the plurality of discs, and simultaneously perform a centering operation with respect to the discs.

However, the centering operation described above is performed in the interior of the discs, and thus a chucking state has to be continuously maintained during a recording of data, which may cause a transformation of the discs. Additionally, because the disc chuck performs the chucking and centering operations simultaneously, an interior configuration becomes complicated, making it difficult to maintain and repair the disc centering device. Furthermore, because the weight of the disc chuck is increased, a centrifugal force generated during a rotating is increased, creating a vibration problem due to the rotation of the discs.

SUMMARY OF THE INVENTION

Accordingly, it is an aspect of the present invention to provide a disc centering device which secures accurate locations of discs.

Additional aspects and advantages of the invention will be set forth in part in the description which follows and, in part, will be obvious form the description, or may be learned by practice of the invention.

To achieve the above and/or other aspects of the present invention, there is provided a disc centering device comprising a base plate, a chuck which is installed on the base plate, a hub unit which is detachably engaged to the chuck and receives discs to be stacked, disc pushers which are slidably provided outside the hub unit and include corresponding plate springs which push circumferences of the discs and center the discs, supporting units which support the corresponding plate springs so as to reinforce a restoring force of the plate springs after s disc centering of the discs, and a driving unit which slides the disc pushers simultaneously.

Each supporting unit may be provided in a part of the corresponding plate spring.

Each supporting unit may be provided in a side end part of the corresponding plate spring.

Each of the supporting units may include a supporting block which supports the side end part of the corresponding plate spring, and at least one screw which fastens the corresponding plate spring to the supporting block.

BRIEF DESCRIPTION OF THE DRAWINGS

These and/or other aspects and advantages of the present invention will become apparent and more readily appreciated from the following description of the embodiments, taken in conjunction with the accompany drawings of which:

FIG. 6 is a table illustrating a deviation of the plate spring caused by a centering operation of the disc centering device shown in FIGS. 1 and 2.

DETAILED DESCRIPTION OF THE PREFERRED EMBODIMENTS

Figure 1:
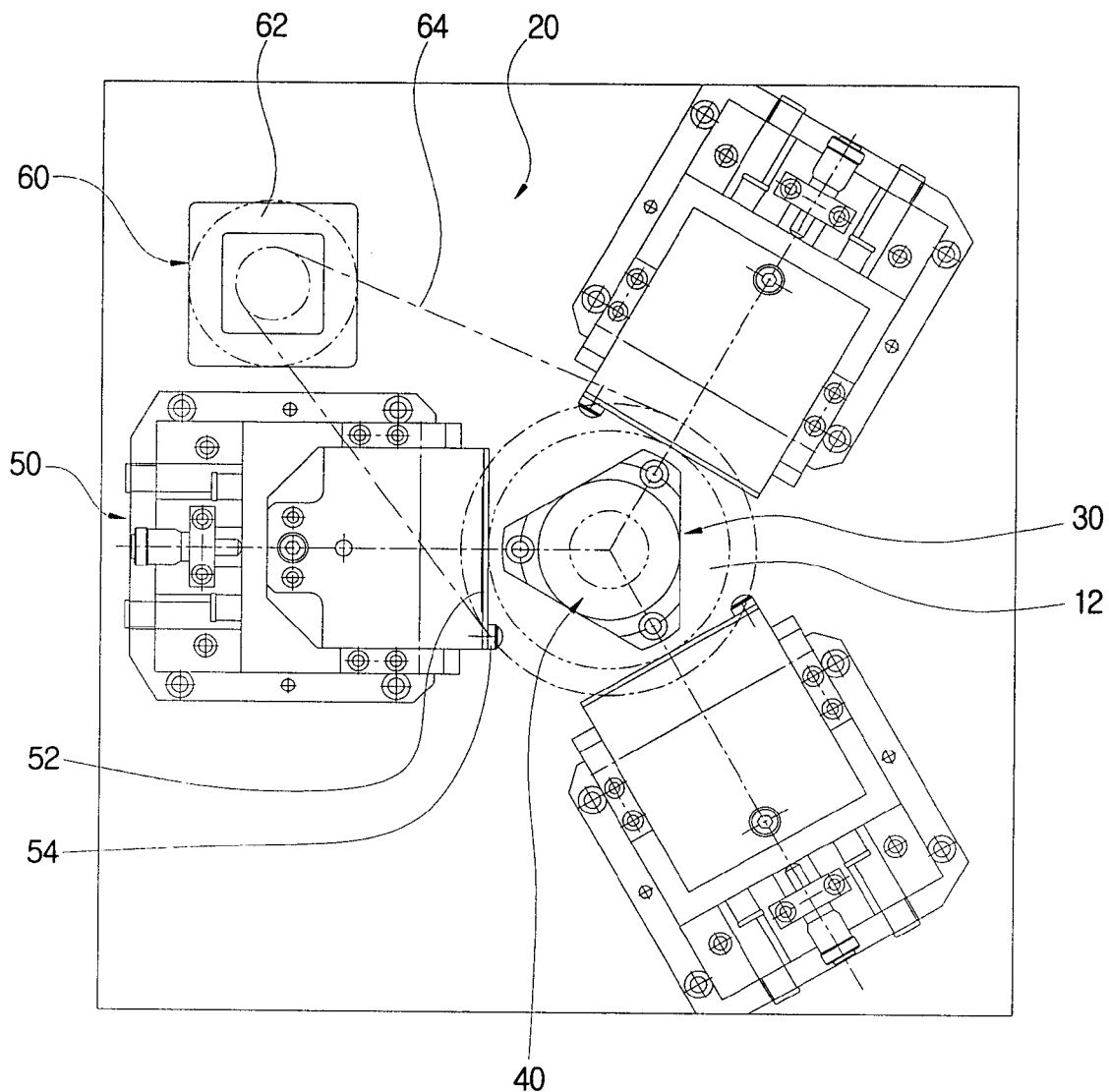
FIG. 1 is a partial plan view of a disc centering device according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
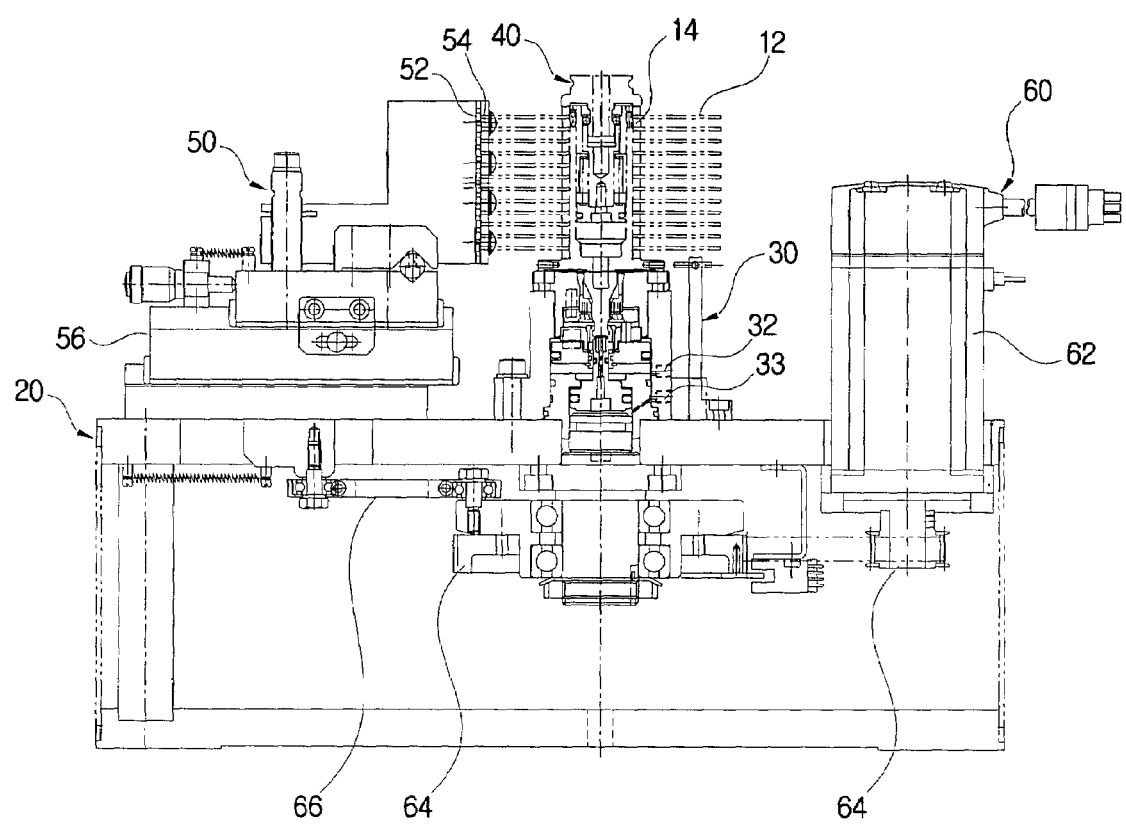
FIG. 2 is a front view of the disc centering device shown in FIG. 1.

FIG. 1 shows a plan view of a disc centering device according to an embodiment of the present invention. FIG. 2 is a front view illustrating the disc centering device shown in FIG. 1.

As shown in FIGS. 1 and 2, the disc centering device comprises a base plate 20, a chuck 30 which is provided on the base plate 20, a hub unit 40 which is detachably engaged to the chuck 30 and receives discs 12 to be stacked, disc pushers 50 which are slidably provided outside the hub unit 40 and include corresponding plate springs 52 which push circumferences of the discs 12 and center the discs 12, a driving unit 60 which slides the disc pushers 50 simultaneously, and supporting blocks 53 (see FIG. 5) which support the corresponding plate springs 52 with respect to the disc pushers 50 so as to reinforce a restoring force of the plate springs 52 with respect to a disc centering of the discs 12.

The chuck 30 fixes the hub unit 40, and a first air port 32 and a second air port 33 are formed in an outside thereof. The hub unit 40 is chucked on the chuck 30, and the discs 12 stacked with respect to the hub unit 40 are supported by a compressed air passing through the first and second air ports 32 and 33.

Spacers 14 are interposed between the discs 12 so as to space each of the discs 12 apart from each other.

The hub unit 40 has a cylindrical structure so as to allow the discs 12 and the spacers 14 to be inserted and stacked, the height of which can be adjusted according to a number of the discs 12.

The disc pushers 50 are provided in a radial direction relative to the discs 12 stacked in the hub unit 40. In this embodiment, three disc pushers 50 are installed at intervals of 120 degrees. The disc pushers 50 are mounted on a linear guide 56 which is moved back and forth by the driving unit 60.

The driving unit 60 includes a motor 62, a belt pulley 64 which is connected to the motor 62 and the disc pushers 50, and a link 66 which is linearly moved by the belt pulley 64 and moves the disc pushers 50, simultaneously, back or forth. The driving unit 60 may have various configurations known or to be known, such as a cylindrical actuator which enables the disc pushers 50 to move back and forth, as well as a configuration which enables the disc pushers 50 to move back and forth by the motor 62.

Figure 5:
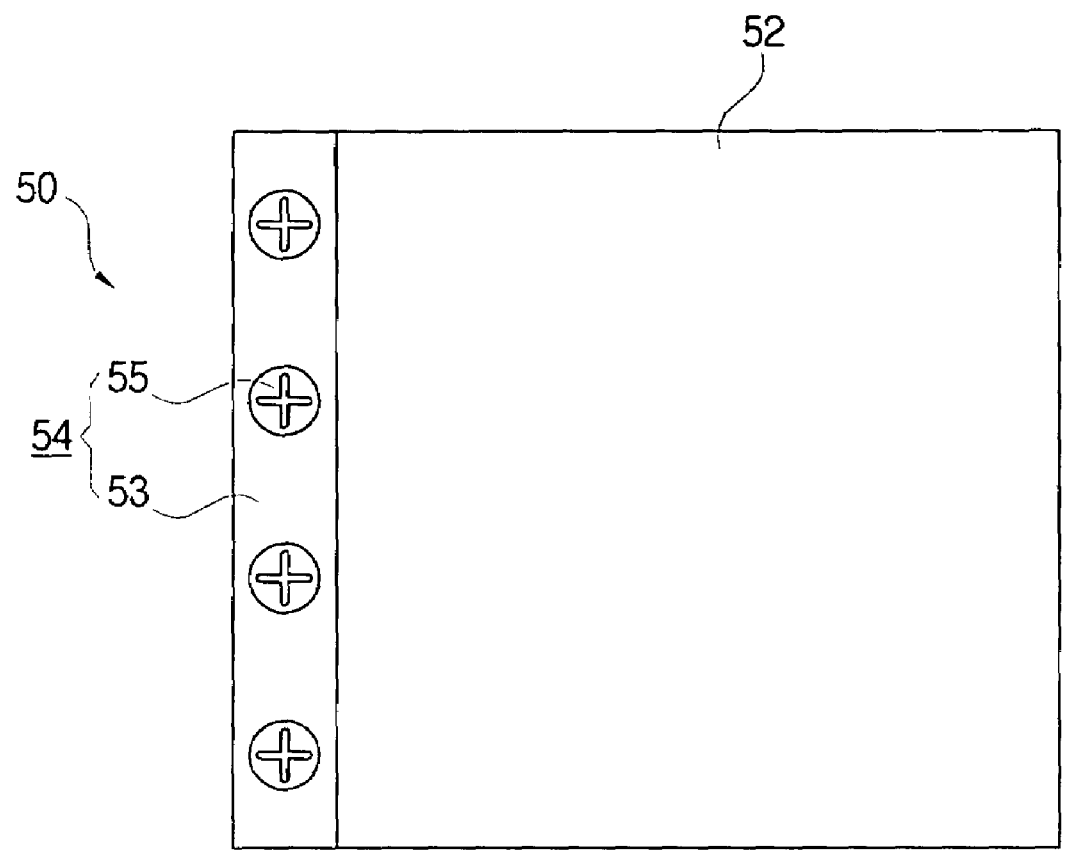
FIG. 5 is a plan view illustrating a plate spring provided in the disc centering device shown in FIGS. 1 and 2.

With respect to each of the disc pushers 50, one plate spring 52 may be used as shown in FIG. 5. However, it is understood that layered plate springs 52 can be used.

Figure 3:
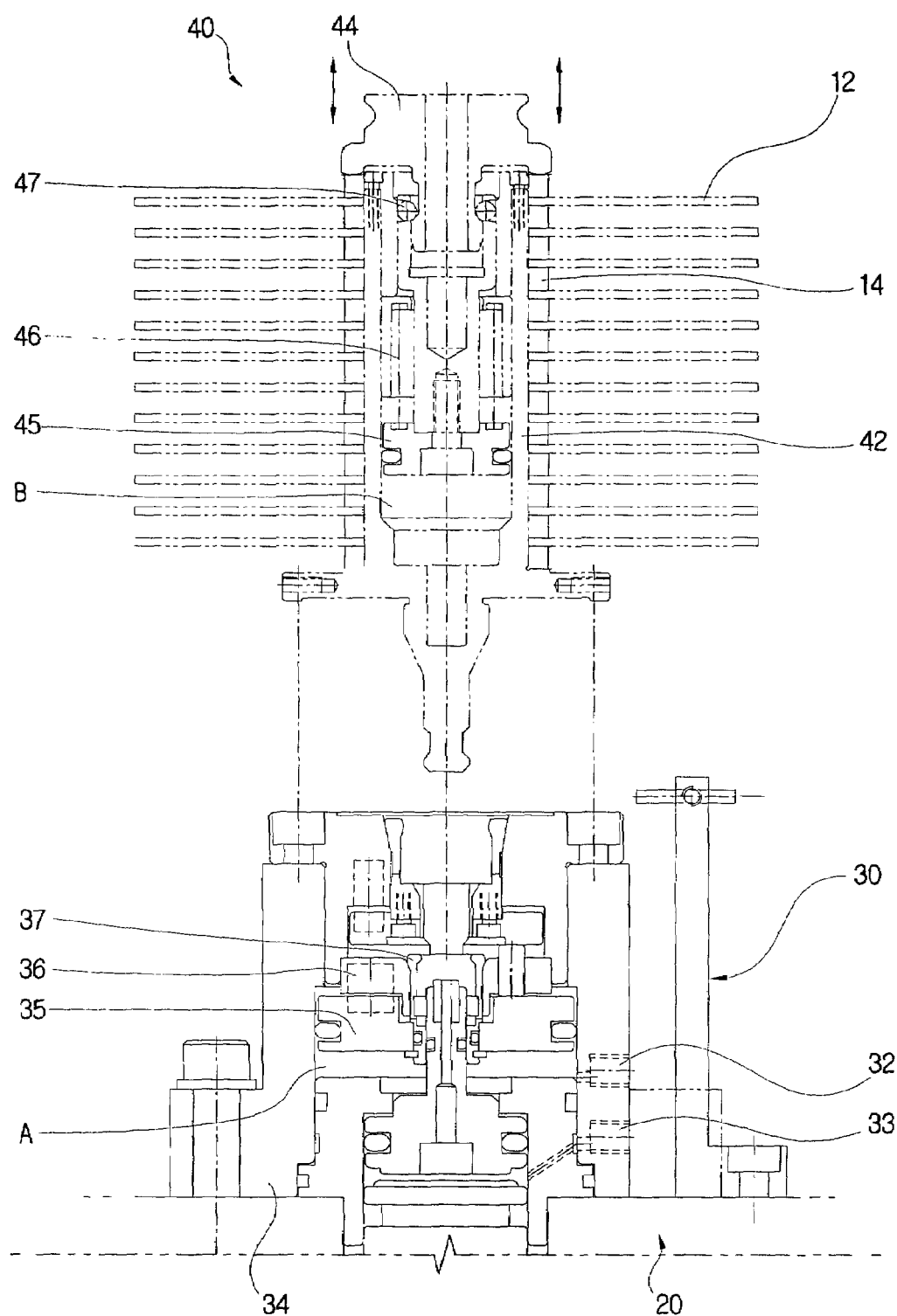
FIG. 3 is an exploded view of a chuck and a hub unit of the disc centering device shown in FIGS. 1 and 2.
Figure 4:
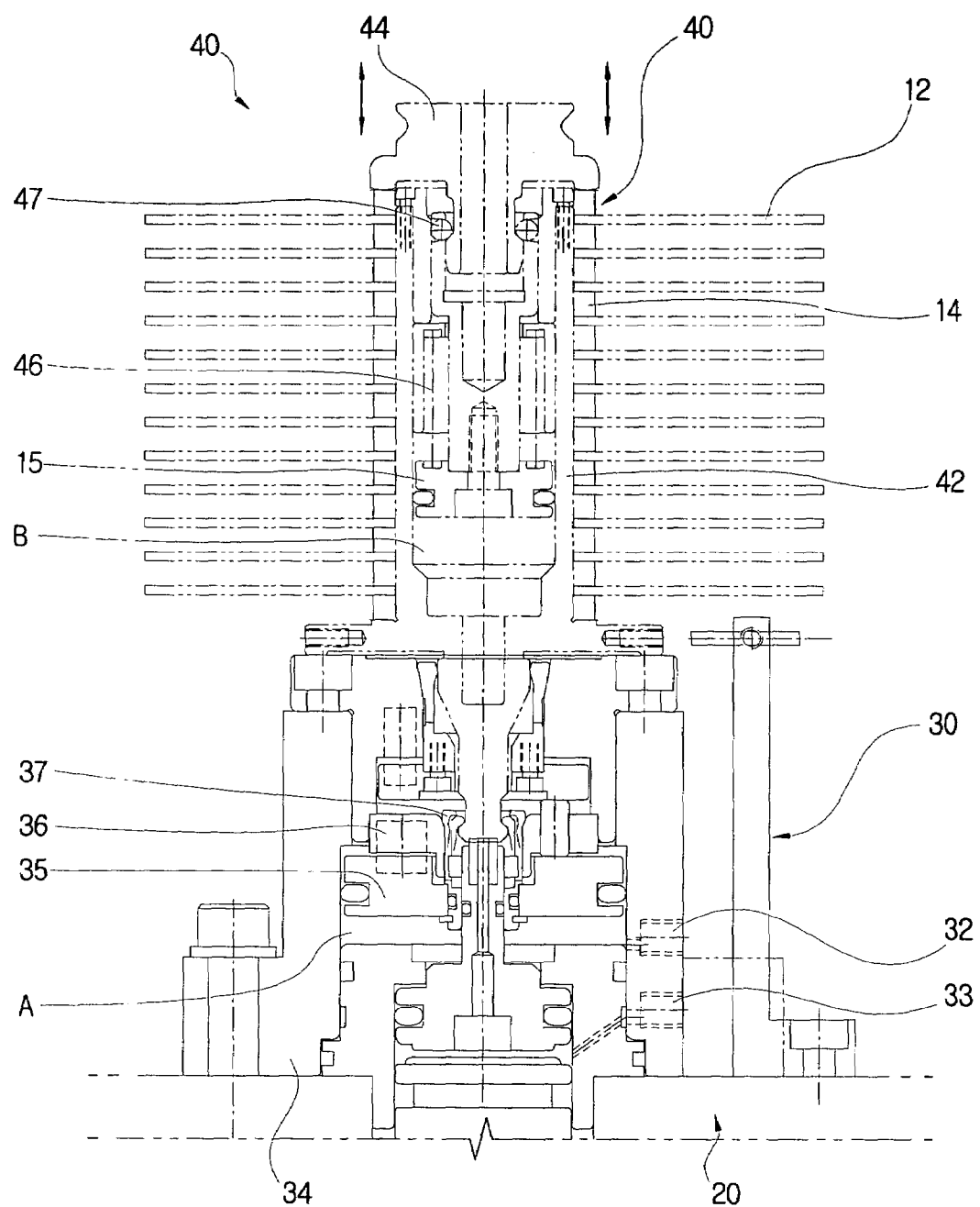
FIG. 4 is a front view of the chuck and the hub unit which are engaged with respect to the disc centering device shown in FIGS. 1 and 2.

FIG. 3 shows an exploded view of the chuck 30 and the hub unit 40 of the disc centering device shown in FIGS. 1 and 2. FIG. 4 shows a view similar to FIG. 3 except where the chuck 30 and the hub unit 40 of the disc centering device are engaged.

As shown in FIGS. 3 and 4, the chuck 30 includes a chuck body 34 installed on the base plate 20, a first piston 35 which is provided in the chuck body 34 and rises according to a provision of a compressed air, a first piston spring 36 which pushes the first piston 35 on an upper part thereof, and a collet 37 which grabs or relieves the hub unit 40 according to an up or down movement of the first piston 35.

The hub unit 40 includes a hub body 42 which is detachably engaged to the chuck 30 and in which the plurality of discs 12 are stacked, and a hub cap 44 which moves up or down with respect to an upper part of the hub body 42, and pushes the plurality of stacked discs 12. The hub unit 40 further includes a second piston 45, a second piston spring 46 which pushes the second piston 45 on an upper part thereof, and rising balls 47 which enable the hub cap 44 to be detached according to the up or down movement of the second piston 45.

The collet 37 of the chuck 30 moves up or down by a compressed air provided to an interior space "A" through the first air port 32, and the hub cap 44 of the hub unit 40 moves up or down by a compressed air provided to an interior space "B" through the second air port 33.

A state of engagement and operation of the chuck 30 and the hub unit 40 are described below.

Where a compressed air is provided to the interior space "A" through the first air port 32 of the chuck 30, the collet 37 moves up and gets wider. Herein, where the provision of the compressed air through the first air port 32 is cut off after inserting the hub body 42 of the hub unit 40 into the collet 37, the collet 37 moves down by the first piston spring 36 and chucks the hub body 42.

Where the discs 12 and the spacers 14 are completely and sequentially stacked with respect to a circumference of the hub body 42, the rising balls 47 in the hub body 42 move up by the second piston 45 and move in a radial direction relative to an vertical axis of the hub body 42, as a compressed air is provided to the interior space "B" through the second air port 33, so as to assemble the hub cap 44.

After assembling the hub cap 44, where the second air port 33 is cut off, the hub cap 44 is moved down along with the rising balls 47, as the rising balls 47 fall according to the second piston spring 46. Accordingly, the hub cap 44 stably pushes the discs 12 and the spacers 14 with respect to the hub unit 40.

FIG. 5 shows the supporting block 53 provided to each of the disc pushers 50 of the disc centering device according to the present invention. Each of the disc pushers 50 includes the plate spring 52 and a supporting unit 54.

As shown in FIG. 5, the supporting unit 54 includes the supporting block 53 which compresses and supports the plate spring 52, and screws 55 which engage the plate spring 52 to the supporting block 53.

The supporting unit 54 is provided in a side end part of the plate spring 52 so as to allow the plate spring 52 to have the same carrying capacity for each disc 12, and restore the plate spring 52 to an original state where a disc centering operation is repeated. The supporting block 53 can be realized as, for example, a thin and extended bar which completely covers the side end part of plate spring 52.

Where the supporting unit 54 is provided in both sides of the plate spring 52, a restoring force of the plate springs 52 is decreased due to a fixing force thereof. Thus, where the centering device is used, for example, 20 times or more, a centering value may change 30 μm or more, requiring a re-setting operation.

Where the discs 12 are stacked, and the supporting unit 54 is provided with respect to an upper end or a lower end of each plate spring 52, the carry capacities for the discs 12 in the upper and lower end of the plate springs 52 are different from each other by a fixing force. Accordingly, it is difficult to maintain the accuracy of the disc centering. To solve this, the supporting unit 54 is provided, for example, in the side end part of the plate spring 52.

The screws 55 are engaged so that the plate springs 52 can have the same carrying capacity.

FIG. 6 shows a table illustrating a result of a disc centering where an end part of each plate spring 52 is fixed to the corresponding disc pusher 50. As shown, a centering value can be maintained within a certain deviation, and therefore, the disc centering can be performed effectively. Although not shown in the table, even after testing 200 times or more, the centering value was maintained with little deformation, and with only about 10 μm of deviation.

An operation of the disc centering device is further described below.

After installing the chuck 30 on the base plate 20, where the hub body 42 of the hub unit 40 is placed into the collet 37 provided in the chuck 30, and simultaneously, a compressed air provided through the first air port 32 is cut off, the collet 37 moves down to chuck the hub body 42. Before the hub body 42 is placed into the collet 37 provided in the chuck 30, the compressed air is provided through the first air port 32 to maintain the up movement of the collet 37.

A preparation to center the discs 12 is completed by assembling the hub cap 44 with the hub body 42 after sequentially stacking the spacers 14 and the discs 12 in the hub body 42.

Where the driving unit 60 is operated by power, the disc pushers 50 spaced from the hub unit 40 simultaneously move forward, and in response, the discs 12 stacked in the hub unit 40 are centered. Where a centering is completed, a compressed air provided through the second air port 33 is cut off, and accordingly, the hub cap 44 moves down, to thereby allow the hub cap 44 to compress and clamp the discs 12 and the spacers 14. Before the centering is completed, the compressed air is provided through the second air port 33 to maintain the rise of the hub cap 44.

Once the clamping is completed, the disc pushers 50 are retrieved, and a compressed air is provided again through the first air port 32 to thereby produce the hub unit 40, of which the centering is completed.

As described above, using a disc centering device of the present invention, a centering accuracy of discs is improved, which in turn provides the discs, with data recorded thereon, having a uniform quality. Additionally, vibration of a rotation body can be minimized due to the simple configuration the disc centering device.

Also, a supporting block is provided in an end part of a plate spring. Accordingly, the plate spring is restored where a force applied on the plate spring is removed. Furthermore, even though a disc centering is continuously performed, a centering value can be maintained within a desired range (deviation), and deformation of discs can be prevented.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disc centering device comprising:
    a base plate;
    a chuck which is installed on the base plate;
    a hub unit which is detachably engaged to the chuck and receives discs to be stacked;
    disc pushers which are slidably provided outside the hub unit and include corresponding plate springs which push circumferences of the discs and center the discs;
    supporting units provided in an end part of the plate springs, the plate springs being provided between the disc pushers and the supporting units such that the supporting units compress and support the corresponding plate springs with respect to the disc pushers and reinforce a restoring force of the plate springs where a force applied on the plate springs is removed; and
    a driving unit which slides the disc pushers simultaneously.

2. The disc centering device according to claim 1, wherein each supporting unit is provided in a part of the corresponding plate spring.

3. The disc centering device according to claim 2, wherein each supporting unit is provided in a side end part of the corresponding plate spring.

4. The disc centering device according to claim 1, wherein each of the supporting units includes:
    a supporting block which supports the side end part of the corresponding plate spring; and
    at least one screw which fastens the corresponding plate spring to the supporting block.

5. The disc centering device according to claim 4, wherein the support block completely covers the side end part of the corresponding plate spring.

6. The disc centering device according to claim 1, wherein each of the plate springs comprises a plurality of layered plate spring members.

7. The disc centering device according to claim 1, wherein each of the supporting units supports a side end part of the corresponding plate spring with respect to the respective disc pusher so as to maintain a centering value of the discs within a desired level.

8. The disc centering device according to claim 7, wherein the centering value of the discs is maintained within a deviation of about 30 µm or less.

9. The disc centering device according to claim 8, wherein the centering value of the discs is maintained within the deviation of about 10 µm or less.

10. The disc centering device according to claim 1, wherein each of the supporting units supports a side end part of the corresponding plate spring so as to restore the plate spring after the disc centering and prevent a deformation of the discs.

11. The disc centering device according to claim 1, wherein the chuck includes a collet which grabs or relieves the hub unit according to whether a compressed air is provided to the chuck.

12. The disc centering device according to claim 11, wherein the chuck further includes:
    a chuck body which defines the chuck;
    an air chamber which is provided in the chuck body;
    an air port which supplies the compressed air to the air chamber; and
    a piston which is provided in the chuck body and moves up or down according to whether the compressed air is provided to the air chamber, wherein the collet grabs or relieves the hub unit according to an up or down movement of the piston.

13. The disc centering device according to claim 1, wherein the hub unit comprises:
    a hub body which is detachably engaged to the chuck and receives the discs; and p1 a hub cap which moves up or down to clamp the discs stacked with respect to the hub body.

14. The disc centering device according to claim 13, wherein the hub cap moves up or down according to whether a compressed air is provided to the hub unit.

15. The disc centering device according to claim 13, wherein the hub unit further comprises:
    an air chamber which is provided in the hub body to receive a compressed air; and
    a piston which is provided in the hub body and moves up or down according to whether the compressed air is provided to the air chamber, wherein the hub cap is provided at an upper portion of the hub body, and pushes or releases the disc with respect to the hub body according to an up or down movement of the piston.

16. The disc centering device according to claim 1, wherein the disc pushers are provided in a radial direction relative to the hub unit.

17. The disc centering device according to claim 16, wherein the disc pushers include first, second and third disc pushers which are provided at intervals of 120 degrees with respect to the hub unit.

18. The disc centering device according to claim 1, wherein the driving unit includes:
a motor;
a belt pulley which is connected to the motor and the disc pushers; and
a link which is linearly moved by the belt pulley and simultaneously moves the disc pushers back or forth.

19. The disc centering device according to claim 1, wherein the driving unit includes cylindrical actuators which drive the corresponding disc pushers.

20. The disc centering device according to claim 1, wherein the plate springs simultaneously pressurize the circumferences of the discs having different diameters.

21. The disc centering device according to claim 1, further comprising a linear guide unit which mounts the disc pushers, wherein the linear guide unit slides the disc pushers according to the driving unit.

22. The disc centering device according to claim 1, wherein the supporting units support the plate springs so as to reinforce the restoring force after a disc centering of the discs.

23. A disc centering device comprising:
a base plate;
a chuck which is installed on the base plate;
a hub unit which is detachably engaged to the chuck and receives discs to be stacked;
a disc centering unit including a disc pusher and plate springs which are slidably provided outside the hub unit and simultaneously pressurize circumferences of the discs to center the discs, wherein the disc centering unit includes reinforcing units provided at respective side ends of the plate springs, the plate springs being provided between the disc pusher and the reinforcing units such that the reinforcing units compress and support the corresponding plate springs with respect to the disc pusher, and that provide for the same carrying capacity of the discs and restore the plate springs to an original state after a disc centering operation where a force applied on the plate springs is removed; and
a driving unit which drives the disc centering unit.

24. The disc centering device according to claim 23, wherein the reinforcing units are extended bars which support the plate springs, at the side ends thereof, with respect to the disc centering unit so as to restore the plate springs.

25. A disc centering device comprising:
a base plate;
a chuck which is installed on the base plate;
a hub unit which is detachably engaged to the chuck and receives discs to be stacked;
disc pushers which are slidably provided outside the hub unit and include corresponding plate springs which push circumferences of the discs and center the discs;
supporting units which support the corresponding plate springs with respect to the disc pushers so as to reinforce a restoring force of the plate springs; and
a driving unit which slides the disc pushers simultaneously;
wherein the chuck includes a collet which grabs or relieves the hub unit according to whether a compressed air is provided to the chuck.

26. A disc centering device comprising:
a base plate;
a chuck which is installed on the base plate;
a hub unit which is detachably engaged to the chuck and receives discs to be stacked, the hub unit including a hub body which is detachably engaged to the chuck and receives the discs and a hub cap which moves up or down to clamp the discs stacked with respect to the hub body;
disc pushers which are slidably provided outside the hub unit and include corresponding plate springs which push circumferences of the discs and center the discs;
supporting units which support the corresponding plate springs with respect to the disc pushers so as to reinforce a restoring force of the plate springs; and
a driving unit which slides the disc pushers simultaneously;
wherein the hub cap moves up or down according to whether a compressed air is provided to the hub unit.

27. A disc centering device comprising:
a base plate;
a chuck which is installed on the base plate;
a hub unit which is detachably engaged to the chuck and receives discs to be stacked;
disc pushers which are slidably provided outside the hub unit and include corresponding plate springs which push circumferences of the discs and center the discs;
supporting units which support the corresponding plate springs with respect to the disc pushers so as to reinforce a restoring force of the plate springs; and
a driving unit which slides the disc pushers simultaneously and includes a motor, a belt pulley which is connected to the motor and the disc pushers, and a link which is linearly moved by the belt pulley and simultaneously moves the disc pushers back or forth.

28. A disc centering device comprising:
a base plate;
a chuck which is installed on the base plate;
a hub unit which is detachably engaged to the chuck and receives discs to be stacked;
disc pushers which are slidably provided outside the hub unit and include corresponding plate springs which push circumferences of the discs and center the discs;
supporting units which support the corresponding plate springs with respect to the disc pushers so as to reinforce a restoring force of the plate springs; and
a driving unit which slides the disc pushers simultaneously;
wherein the plate springs simultaneously pressurize the circumferences of the discs having different diameters.

29. A disc centering device comprising:
a base plate;
a chuck which is installed on the base plate;
a hub unit which is detachably engaged to the chuck and receives discs to be stacked;
disc pushers which are slidably provided outside the hub unit and include corresponding plate springs which push circumferences of the discs and center the discs;
supporting units which support the corresponding plate springs with respect to the disc pushers so as to reinforce a restoring force of the plate springs; and
a driving unit which slides the disc pushers simultaneously;
wherein the chuck includes a collet which grabs or relieves the hub unit according to whether a compressed air is provided to the chuck, a chuck body which defines the chuck, an air chamber which is provided in the chuck body, an air port which supplies the compressed air to the air chamber, and a piston which is provided in the chuck body and moves up or down according to whether the compressed air is provided to the air chamber, and wherein the collet grabs or relieves the hub unit according to an up or down movement of the piston.

30. A disc centering device comprising:

a base plate;

a chuck which is installed on the base plate;

a hub unit which is detachably engaged to the chuck and receives discs to be stacked, the hub unit including a hub body which is detachably engaged to the chuck and receives the discs, a hub cap which moves up or down to clamp the discs stacked with respect to the hub body, an air chamber which is provided in the hub body to receive a compressed air, and a piston which is provided in the hub body and moves up or down according to whether the compressed air is provided to the air chamber;

disc pushers which are slidably provided outside the hub unit and include corresponding plate springs which push circumferences of the discs and center the discs;

supporting units which support the corresponding plate springs with respect to the disc pushers so as to reinforce a restoring force of the plate springs; and a driving unit which slides the disc pushers simultaneously;

wherein the hub cap is provided at an upper portion of the hub body, and pushes or releases the disc with respect to the hub body according to an up or down movement of the piston.

* * * * *

UNITED STATES PATENT AND TRADEMARK OFFICE
CERTIFICATE OF CORRECTION

| | | |
|---|---|---|
| PATENT NO. | : 7,188,402 B2 | Page 1 of 1 |
| APPLICATION NO. | : 10/676145 | |
| DATED | : March 13, 2007 | |
| INVENTOR(S) | : Tae-hoe Ha | |

It is certified that error appears in the above-identified patent and that said Letters Patent is hereby corrected as shown below:

On title page Item [56]
First Page, Column 2, (Other Publications), Line 6, change "Indentifier" to --Identifier--.

Column 6, Line 44, Claim 13, after "and" delete "p1".

Signed and Sealed this

Twenty-fourth Day of July, 2007

JON W. DUDAS
*Director of the United States Patent and Trademark Office*